US012179048B2

(12) United States Patent
Sobol et al.

(10) Patent No.: US 12,179,048 B2
(45) Date of Patent: Dec. 31, 2024

(54) FIRE BARRIER, A METHOD FOR INSTALLING THE SAME, AN EXPANSION JOINT SYSTEM AND A FIRE BARRIER ASSEMBLY

(71) Applicant: SIKA TECHNOLOGY AG, Baar (CH)

(72) Inventors: John Sobol, Amherst, NY (US); Gary Moore, Amherst, NY (US); Neil Jesse Hamilton, Lockport, NY (US); Paul Pumm, Amherst, NY (US); Greg Ross, Amherst, NY (US)

(73) Assignee: SIKA TECHNOLOGY AG, Baar (CH)

( * ) Notice: Subject to any disclaimer, the term of this patent is extended or adjusted under 35 U.S.C. 154(b) by 408 days.

(21) Appl. No.: 17/533,916

(22) Filed: Nov. 23, 2021

(65) Prior Publication Data

US 2022/0080235 A1 Mar. 17, 2022

Related U.S. Application Data

(63) Continuation-in-part of application No. 16/709,226, filed on Dec. 10, 2019, now Pat. No. 11,180,914.

(60) Provisional application No. 62/777,796, filed on Dec. 11, 2018.

(51) Int. Cl.

*E04B 1/68* (2006.01)
*A62C 2/06* (2006.01)
*A62C 3/02* (2006.01)
*E04B 1/94* (2006.01)

(52) U.S. Cl.

CPC ............ *A62C 2/065* (2013.01); *A62C 3/0214* (2013.01); *A62C 3/0257* (2013.01); *E04B 1/68* (2013.01); *E04B 1/947* (2013.01); *E04B 1/948* (2013.01)

(58) Field of Classification Search

CPC ..... A62C 2/068; A62C 3/0214; A62C 3/0257; E04B 1/68; E04B 1/6801; E04B 1/62; E04B 1/947; E04B 1/948; E01C 23/026; E01C 23/028; E01D 19/06; E01D 19/005

USPC ............................................... 52/366, 745.21

See application file for complete search history.

(56) References Cited

U.S. PATENT DOCUMENTS 3,458,329 A 7/1969 Owens et al.
3,581,450 A 6/1971 Patry
3,916,057 A 10/1975 Hatch et al.
4,058,947 A * 11/1977 Earle ..................... E04B 1/6801 404/66
4,305,992 A 12/1981 Langer et al.
4,566,242 A * 1/1986 Dunsworth ............. E04B 1/946 52/396.01
4,866,898 A 9/1989 Laroche et al.
4,942,710 A 6/1990 Rumsey
5,088,256 A 2/1992 Face, Jr.
5,502,937 A * 4/1996 Wilson .................... B32B 15/20 52/273
5,765,332 A * 6/1998 Landin .................... E04B 1/948 52/235
5,875,598 A 3/1999 Batten et al.
6,112,488 A 9/2000 Olson et al.
6,128,874 A 10/2000 Olson et al.
6,131,352 A 10/2000 Barnes et al.
6,666,618 B1 12/2003 Anaya et al.

(Continued)

*Primary Examiner* — Paola Agudelo
(74) *Attorney, Agent, or Firm* — Oliff PLC

(57) ABSTRACT

The presently claimed invention relates to a fire barrier, a method for installing the same, an expansion joint system and a fire barrier assembly.

22 Claims, 7 Drawing Sheets

(56) References Cited

U.S. PATENT DOCUMENTS

| | | | | |
|---|---|---|---|---|
| 8,365,495 | B1 * | 2/2013 | Witherspoon | E04B 1/98 52/396.01 |
| 8,813,450 | B1 * | 8/2014 | Hensley | E04B 1/6804 52/396.01 |
| 10,087,591 | B1 | 10/2018 | Moore et al. | |
| 10,323,409 | B1 | 6/2019 | Robinson | |
| 10,407,900 | B2 | 9/2019 | Moore et al. | |
| 2008/0172967 | A1 * | 7/2008 | Hilburn | E04B 1/948 52/396.01 |
| 2008/0263980 | A1 | 10/2008 | Shaw | |
| 2012/0023846 | A1 * | 2/2012 | Mattox | E04B 1/948 264/267 |
| 2016/0060862 | A1 * | 3/2016 | Barr | E04B 1/68 52/471 |
| 2017/0342665 | A1 | 11/2017 | Robinson | |
| 2020/0002906 | A1 | 1/2020 | Moore et al. | |
| 2020/0181901 | A1 * | 6/2020 | Sobol | A62C 2/065 |

* cited by examiner

FIRE BARRIER, A METHOD FOR INSTALLING THE SAME, AN EXPANSION JOINT SYSTEM AND A FIRE BARRIER ASSEMBLY

CROSS REFERENCE TO RELATED APPLICATIONS

This application is a continuation-in-part of U.S. Ser. No. 16/709,226, filed Dec. 10, 2019, which claims the benefit of the filing date under 35 U.S.C. § 119(e) from United States Provisional Application For Patent Ser. No. 62/777,796, filed Dec. 11, 2018, both of which are hereby incorporated by reference in their entireties.

FIELD OF INVENTION

The presently claimed invention relates to a fire barrier, a method for installing the same, an expansion joint system and a fire barrier assembly.

BACKGROUND OF THE INVENTION

Buildings and other structures are known to experience stress from many sources, such as extreme and/or repetitive changes in temperature, the force of high impinging winds, compression and expansion forces due to seismic events, settling of subsoil, building remodels, and excavation on or near the site. To minimize the effect of these stresses on the buildings or other structures, building codes now require that all structures must be constructed with spaces between adjacent wall, floor, and ceiling building units. These spaces, generally linear openings, are commonly referred to in the trade as “expansion joints,” “construction joints,” “soft joints,” “seismic joints,” “expansion spaces,” or “expansion joint spaces.” These spaces allow differential building movement to take place without risking damage to the structure, and thus are frequently referred to as “dynamic”.

While expansion joints improve the life-time integrity of structures, they present a major risk in the event of a fire because the channels created by the expansion joints act in effect, as chimney flues providing pathways for gases, flame, and smoke to spread rapidly throughout the structure. To counter the flue effect, building codes for commercial or public structures generally require fire barriers to be installed in the expansion joints to reduce or prevent the spread of flames, smoke, and gas through the spaces into adjoining areas. Fire barriers protect both the structure and those who are within the structure by extending the time available for inhabitants to leave and for fire fighters to get to the fire. These fire barriers are in general known, for instance in U.S. Pat. No. 6,112,488 A.

The existing fire barriers, however, have severe limitations. One such limitation is of meeting the requirements of UL 2079, in particular the requirement for a 3-hour rating in accordance with the norm. Additionally, these fire barriers do not provide for acceptable fire protection and have a complex geometry, which renders it difficult to install.

It was, therefore, an object of the presently claimed invention to provide for a fire barrier that is capable of meeting the requirement for the 3-hour rating according to UL 2079, provides for excellent fire protection and is easy to install.

SUMMARY OF THE INVENTION

Surprisingly, it has been found that the above object is met by providing a fire barrier (200) which comprises a first fire blanket (10) having a top side (11), a bottom side (12), a first lateral side (13) and a second lateral side (14), said first fire blanket (10) comprising a ceramic fiber blanket surrounded with a metal foil; a second fire blanket (20) having a top side (21), a bottom side (22), a first lateral side (23) and a second lateral side (24), said second fire blanket (20) comprising a ceramic fiber blanket surrounded with a metal foil; a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

Accordingly, in one aspect, the presently claimed invention is directed to a fire barrier (200) comprising:

- a fire blanket (10) having a top side (11), a bottom side (12), a first lateral side (13) and a second lateral side (14), said fire blanket (10),
- a first intumescent sheet (40) having a first surface (41) and a second surface (42), said first intumescent sheet (40) configured to be affixed to a first structure (300), and
- a second intumescent sheet (50) having a first surface (51) and a second surface (52), said second intumescent sheet (50) configured to be affixed to a second structure (400)
- wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50).

Accordingly, in one aspect, the presently claimed invention is directed to a fire barrier (200) comprising:

- a first fire blanket (10) having a top side (11), a bottom side (12), a first lateral side (13) and a second lateral side (14), said first fire blanket (10) comprising a ceramic fiber blanket surrounded with a metal foil,
- a second fire blanket (20) having a top side (21), a bottom side (22), a first lateral side (23) and a second lateral side (24), said second fire blanket (20) comprising a ceramic fiber blanket surrounded with a metal foil,
- a first intumescent sheet (40) having a first surface (41) and a second surface (42), said first intumescent sheet (40) affixed to a first structure (300), and
- a second intumescent sheet (50) having a first surface (51) and a second surface (52), said second intumescent sheet (50) affixed to a second structure (400),
- wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

In another aspect, the presently claimed invention is directed to a fire barrier (200) comprising:

- a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

In another aspect, the presently claimed invention is directed to a method for installing an expansion joint fire barrier, comprising the steps of:

(A) providing a first structure (300) and a second structure (400) spatially separated to form an expansion joint therebetween, and (B) affixing at least one fire barrier (200) as described herein into the expansion joint.

In another aspect, the presently claimed invention is directed to a method for installing an expansion joint fire barrier, comprising the steps of:

(A) providing a first structure (300) and a second structure (400) spatially separated to form an expansion joint therebetween, and (B) affixing at least one fire barrier (200) into the expansion joint, the fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50).

In another aspect, the presently claimed invention is directed to a method for installing an expansion joint fire barrier, comprising the steps of:

(A) providing a first structure (300) and a second structure (400) spatially separated to form an expansion joint therebetween, and (B) affixing at least one fire barrier (200) into the expansion joint, the fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

In still another aspect, the presently claimed invention is directed to an expansion joint system (110) comprising:

a first structure (300) and a second structure (400) spatially separated to form an expansion joint therebetween, and a fire barrier (200) as described herein, wherein the second surface (42) of the first intumescent sheet (40) is affixed to the first structure (300) and the second surface (52) of the second intumescent sheet (50) is affixed to the second structure (400).

In still another aspect, the presently claimed invention is directed to an expansion joint system (110) comprising:

a first structure (300) and a second structure (400) spatially separated to form an expansion joint therebetween, and a fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50), wherein the second surface (42) of the first intumescent sheet (40) is affixed to the first structure (300) and the second surface (52) of the second intumescent sheet (50) is affixed to the second structure (400).

In still another aspect, the presently claimed invention is directed to an expansion joint system (110) comprising:

a first structure (300) and a second structure (400) spatially separated to form an expansion joint therebetween, and a fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20)

are affixed to a portion of the first surface (51) of the second intumescent sheet (50), wherein the second surface (42) of the first intumescent sheet (40) is affixed to the first structure (300) and the second surface (52) of the second intumescent sheet (50) is affixed to the second structure (400).

In yet another aspect, the presently claimed invention is directed to a fire barrier assembly comprising:

at least one fire barrier (200) as described herein, and at least one pressure sensitive adhesive that affixes the at least one fire barrier (200) to the second surface (42) of the first intumescent sheet (40) and the second surface (52) of the second intumescent sheet (50).

In yet another aspect, the presently claimed invention is directed to a fire barrier assembly comprising:

at least one fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50), and at least one pressure sensitive adhesive that affixes the at least one fire barrier (200) to the second surface (42) of the first intumescent sheet (40) and the second surface (52) of the second intumescent sheet (50).

In yet another aspect, the presently claimed invention is directed to a fire barrier assembly comprising:

at least one fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50), and at least one pressure sensitive adhesive that affixes the at least one fire barrier (200) to the second surface (42) of the first intumescent sheet (40) and the second surface (52) of the second intumescent sheet (50).

DETAILED DESCRIPTION OF THE INVENTION

Figure 1:
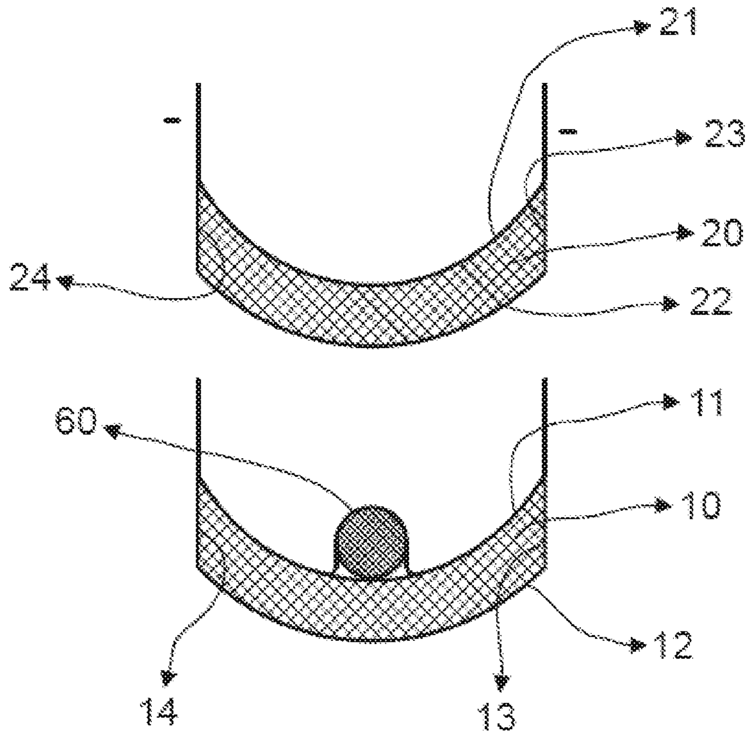
FIG. 1 illustrates an exploded view of the fire barrier comprising fire blankets and flame retardant element.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It is being understood that various changes may be made in the function and arrangement of elements without departing from the spirit and scope of the invention as set forth in the appended claims. It is also to be understood that the terminology used herein and the figure described herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms “first”, “second”, “third” or “(a)”, “(b)”, “(c)”, “(d)” etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms “first”, “second”, “third” or “(A)”, “(B)” and “(C)” or “(a)”, “(b)”, “(c)”, “(d)”, “i”, “ii” etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, the applicant shall be entitled to any equivalents according to the applicable law.

Reference throughout this specification to “one embodiment” or “an embodiment” means that a particular feature, structure or characteristic described in connection with the embodiment is included in at least one embodiment of the presently claimed invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that the individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combinations thereof.

During a fire, buildings and their fire barriers are subject to even greater stress than usual, making it essential that the fire barriers are able to retain their integrity. Accordingly, fire barriers are legally mandated to be tested, rated, and certified. There are two currently mandated tests. One measures the ability of a fire barrier to maintain its structural integrity under compressional and tensional motion. This test is referred to as the "cycle" test and its parameters are specified by ASTM 1399. The other test is referred to as the "fire" or "burn" test and its parameters are specified by UL 2079. The two tests are conducted in sequence. A fire barrier is first cycled 500 times between the compression forces and tension forces and then, if the barrier passes the cycle test, it is placed into a furnace where it is tested for its ability to resist and prevent flame, heat, and gases from passing through the barrier.

Accordingly, an aspect of the presently claimed invention describes a fire barrier (200) comprising:

- a first fire blanket (10) having a top side (11), a bottom side (12), a first lateral side (13) and a second lateral side (14), said first fire blanket (10) comprising a ceramic fiber blanket surrounded with a metal foil,
- a second fire blanket (20) having a top side (21), a bottom side (22), a first lateral side (23) and a second lateral side (24), said second fire blanket (20) comprising a ceramic fiber blanket surrounded with a metal foil,
- a first intumescent sheet (40) having a first surface (41) and a second surface (42), said first intumescent sheet (40) affixed to a first structure (300), and
- a second intumescent sheet (50) having a first surface (51) and a second surface (52), said second intumescent sheet (50) affixed to a second structure (400),
- wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

According to another aspect of the presently claimed invention describes a fire barrier (200) comprising:

- a first fire blanket (10) having a top side (11), a bottom side (12), a first lateral side (13) and a second lateral side (14),
- a second fire blanket (20) having a top side (21), a bottom side (22), a first lateral side (23) and a second lateral side (24),
- a first intumescent sheet (40) having a first surface (41) and a second surface (42), said first intumescent sheet (40) affixed to a first structure (300), and
- a second intumescent sheet (50) having a first surface (51) and a second surface (52), said second intumescent sheet (50) affixed to a second structure (400),
- wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

According to another aspect, the fire barrier (200) comprises

- a fire blanket (10) having a top side (11), a bottom side (12), a first lateral side (13) and a second lateral side (14),
- a first intumescent sheet (40) having a first surface (41) and a second surface (42), said first intumescent sheet (40) configured to be affixed to a first structure (300), and
- a second intumescent sheet (50) having a first surface (51) and a second surface (52), said second intumescent sheet (50) configured to be affixed to a second structure (400),
- wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50).

In an embodiment, the fire barrier (200), as described herein, is capable of meeting the requirement for a 3-hour fire-rating according to UL 2079.

In another embodiment, the fire barrier (200) is affixed between a first structure (300) and a second structure (400) by means of intumescent sheets. These first (300) and second structures (400) can be made of any suitable building material, such as but not limited to, wood, cement, and gypsum board. Additionally, they may be made of the same building material or can be independently selected from different materials. The choice of the building material for the first structure (300) and second structure (400) is well known to the person skilled in the art.

Figure 2:
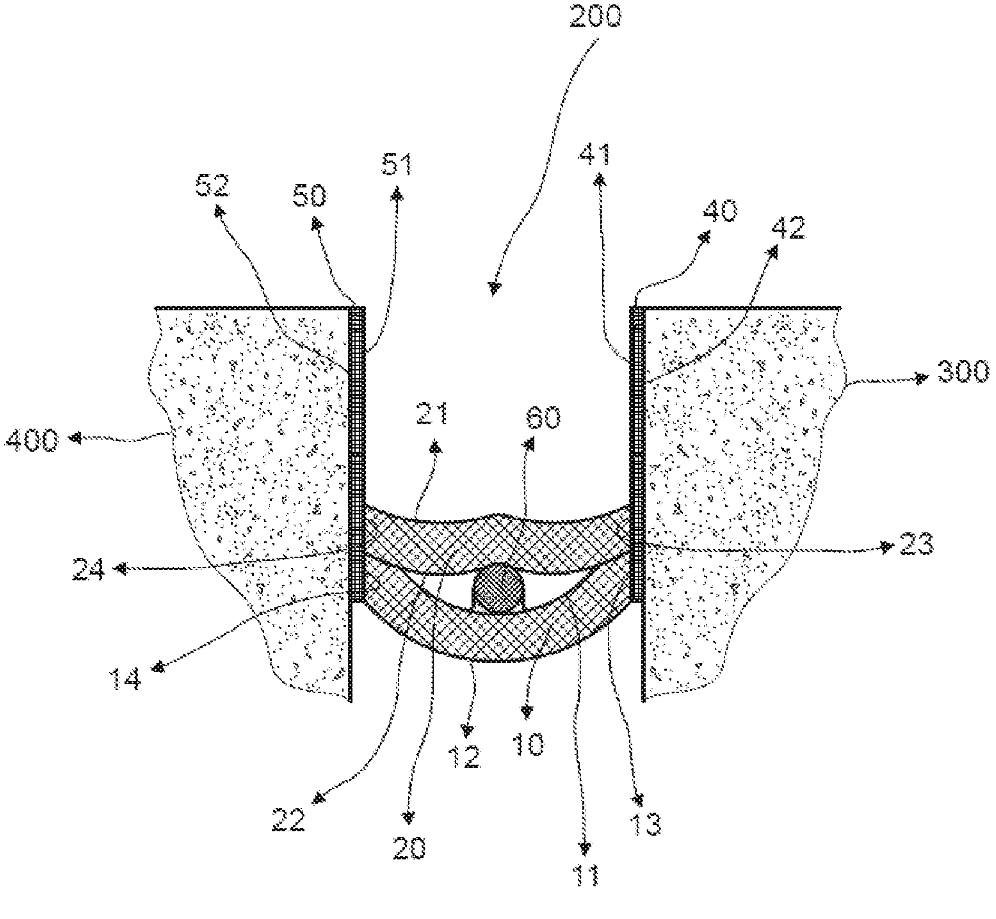
FIG. 2 illustrates the fire barrier of FIG. 1, installed between first structure and second structure.

In another embodiment, as shown in FIG. 2, the first fire blanket (10) and the second fire blanket (20) can be placed one over the other, i.e. the bottom side (22) of the second fire blanket (20) is disposed on the top side (11) of the first fire blanket (10). In an embodiment, the bottom side (22) of the second fire blanket (20) can be affixed to the top side (11) of the first fire blanket (10). Alternatively, the second fire blanket (20) need not be affixed to the first fire blanket (10). In this case, the second fire blanket (20) rests on the first fire blanket (10), thereby forming a void between the second fire blanket (20) and the first fire blanket (10). The said void is occupied with the second fire blanket (20) and the first fire blanket (10) by the expansion of intumescent sheets, as described herein, during fire.

Figure 3:
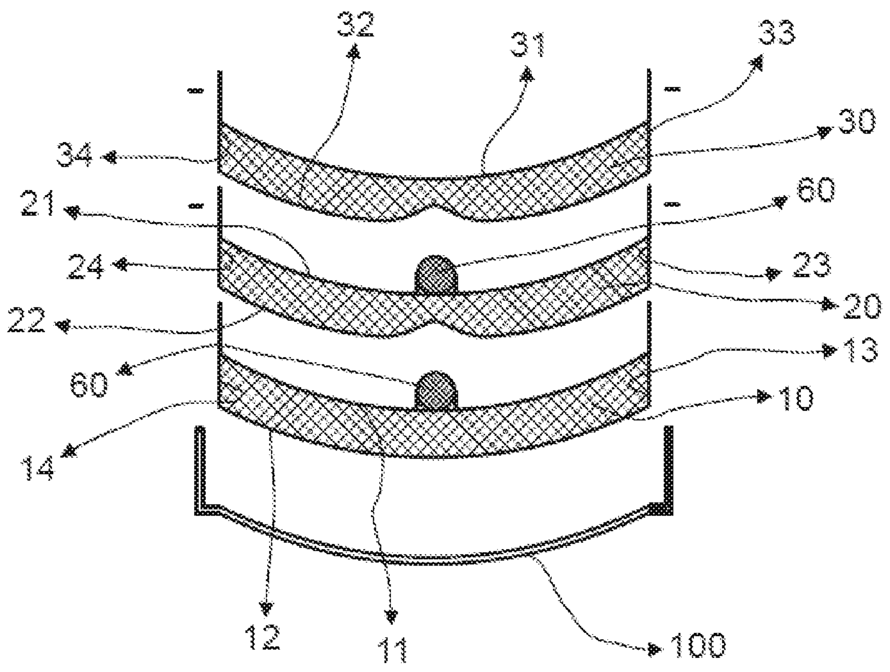
FIG. 3 illustrates an exploded view of the fire barrier comprising fire blankets, flame retardant elements and metal shroud.
Figure 4:
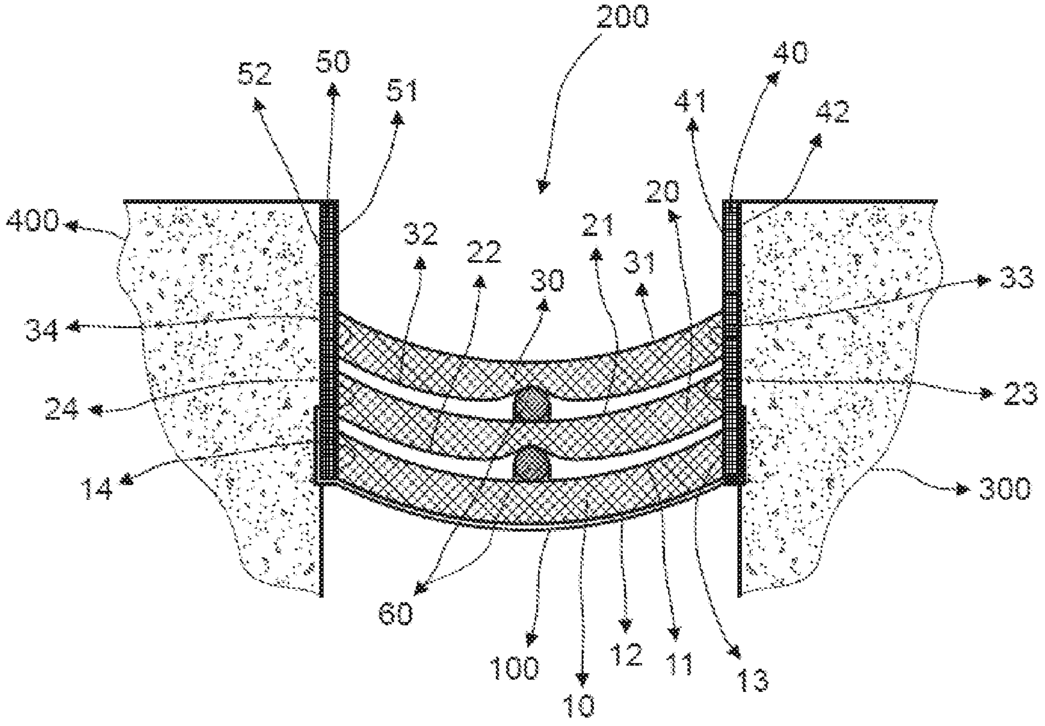
FIG. 4 illustrates the fire barrier of FIG. 3, installed between first structure and second structure.

In another embodiment, as shown in FIGS. 3 and 4, the fire barrier (200) further comprises a third fire blanket (30) having a top side (31), a bottom side (32), a first lateral side (33) and a second lateral side (34). The third fire blanket (30), similar to the first fire blanket (10) and the second fire blanket (20), comprises a ceramic fiber blanket surrounded with the metal foil.

Accordingly, the fire barrier (200) comprises:

the first fire blanket (10) having the top side (11), the bottom side (12), the first lateral side (13) and the second lateral side (14), said first fire blanket (10) comprising the ceramic fiber blanket surrounded with the metal foil, the second fire blanket (20) having the top side (21), the bottom side (22), the first lateral side (23) and the second lateral side (24), said second fire blanket (20) comprising the ceramic fiber blanket surrounded with the metal foil, the third fire blanket (30) having the top side (31), the bottom side (32), the first lateral side (33) and the second lateral side (34), said third fire blanket (30) comprising the ceramic fiber blanket surrounded with the metal foil a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10), the first lateral side (23) of the second fire blanket (20) and the third lateral side (33) of the third fire blanket (30) are affixed to the portion of the first surface (41) of the first intumescent sheet (40) and the second lateral side (14) of the first fire blanket (10), the second lateral side (24) of the second fire blanket (20) and the third lateral side (34) of the third fire blanket (30) are affixed to the portion of the first surface (51) of the second intumescent sheet (50).

According to another aspect, the fire barrier (200) comprises:

the first fire blanket (10) having the top side (11), the bottom side (12), the first lateral side (13) and the second lateral side (14), the second fire blanket (20) having the top side (21), the bottom side (22), the first lateral side (23) and the second lateral side (24), the third fire blanket (30) having the top side (31), the bottom side (32), the first lateral side (33) and the second lateral side (34), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the first fire blanket (10), the first lateral side (23) of the second fire blanket (20) and the third lateral side (33) of the third fire blanket (30) are affixed to the portion of the first surface (41) of the first intumescent sheet (40) and the second lateral side (14) of the first fire blanket (10), the second lateral side (24) of the second fire blanket (20) and the third lateral side (34) of the third fire blanket (30) are affixed to the portion of the first surface (51) of the second intumescent sheet (50).

According to certain illustrative aspects, at least one of the first (10) and second (20) fire blankets of the fire barrier (200) comprises alkaline earth silicate wool fibers, polycrystalline wool fibers, refractory ceramic fibers, alumina magnesia silicate fibers, calcium silicate fibers, kaowool fibers, rockwool fibers, mineral wool fibers, slag wool fibers, stone wool fibers, silica fibers, or combinations thereof.

According to certain illustrative aspects, at least one of the first (10) and second (20) fire blankets of the fire barrier (200) comprise refractory ceramic fibers.

According to certain illustrative aspects, at least one of the first (10) and second (20) fire blankets of the fire barrier (200) comprise alkaline earth silicate wool fibers. Without limitation, and only by way of illustration, the alkaline earth silicate wool fibers comprise magnesium silicate fibers, calcium magnesium silicate fibers and combinations thereof.

According to certain illustrative aspects, at least one of the first (10) and second (20) fire blankets of the fire barrier (200) comprise polycrystalline wool fibers. Without limitation, and only by way of illustration, the polycrystalline wool fibers comprise fibers comprising a mullite composition having 55 weight percent silica or greater, and alumina. Without limitation, and only by way of illustration, the polycrystalline wool fibers comprise fibers comprising a mullite composition having 60 weight percent silica or greater, and alumina. Without limitation, and only by way of illustration, the polycrystalline wool fibers comprise fibers comprising a mullite composition having 70 weight percent silica or greater, and alumina.

According to certain illustrative aspects, at least one of the first (10), second (20) and third (30) fire blankets of the fire barrier (200) comprise comprises high alumina polycrystalline wool fibers comprise comprising 60 weight percent or greater alumina. According to certain illustrative aspects, at least one of the first (10) and second (20) fire blankets of the fire barrier (200) comprise comprises high alumina polycrystalline wool fibers comprise comprising 70 weight percent or greater alumina. According to certain illustrative aspects, at least one of the first (10) and second (20) fire blankets of the fire barrier (200) comprise comprises high alumina polycrystalline wool fibers comprise comprising 80 weight percent or greater alumina. According to certain illustrative aspects, at least one of the first (10) and second (20) fire blankets of the fire barrier (200) comprise comprises high alumina polycrystalline wool fibers comprise comprising 90 weight percent or greater alumina.

According to certain illustrative aspects, at least one of the first (10) and second (20) fire blankets of the fire barrier (200) comprise silica fibers comprising greater than 90 weight percent silica.

At least one of the first, second, and/or third fire blankets are encapsulated or otherwise surrounded by at least one protective layer. The at least one protective layer protects the first, second, and/or third fire blanket(s) from degradation from heat and/or fire. The at least one protective layer prevents or slows the degradation of the first, second, and/or third fire blankets(s) in response to exposure to heat and/or flame. According to certain embodiments, the protective layer may be selected from metal foils, metal alloy foils, high temperature resistant composites, radiant barriers, and combinations thereof. Without limitation, and only by way of illustration, suitable metal foils that can be used in the fire blankets comprise of aluminum, carbon steel, stainless steel, or any other ductile metal. In one embodiment, the first fire blanket (10), the second fire blanket (20) and optionally the third fire blanket (30) comprise of the same metal foil. In other embodiment, the first fire blanket (10), the second fire blanket (20) and optionally the third fire blanket (30), independent of each other, comprise of different metal foil, as described herein.

In another embodiment, as shown in FIG. 2, at least one flame retardant element (60) is disposed between the first fire blanket (10) and the second fire blanket (20), as described herein. The flame retardant element (60), as the name suggests, comprises of flame retardant materials such as but not limited to, ceramic fiber, mineral wool, rock wool, calcium silicate, sodium silicate, potassium silicate, magnesium oxide, intumescent material and silicone. In one embodiment, the flame retardant element (60) comprises of ceramic fiber or intumescent material. In other embodiment, the flame retardant element (60) comprises of ceramic fiber.

One of the advantages of the flame retardant element (60), as described herein, is that it absorbs any excess heat generated during fire. The flame retardant element (60) also provides for additional structural support to the fire barrier (200). The person skilled in the art is well aware of the shapes and dimensions of the flame retardant element (60). However, in an embodiment, the flame retardant element (60) has the shape and dimension, such as but not limited to, that of a rope, sheet and block. In other embodiment, the flame retardant element (60) is a rope.

In one embodiment, as shown in FIGS. 2, 3, 4 and 5, the at least one flame retardant element (60) comprises a ceramic fiber rope. One of the advantages of ceramic fiber rope is that in addition to providing structural support to the fire blankets, it is capable of providing good flame retardant properties and reduces the overall weight of the fire barrier (200), thereby rendering it easy to install. The presence of ceramic fiber rope as the flame retardant element (60) reduces the thickness of the adjacent fire blankets. Since the ceramic fiber rope occupies comparatively less space than the fire blankets, without compromising on flame retardancy, the overall weight of the fire barrier (200) is reduced significantly.

In another embodiment, the at least one flame retardant element (60) is disposed on the top side of at least one of the first fire blanket (10) and/or the second fire blanket (20) and/or optionally the third fire blanket (30) and at least partially covers the top side of at least one of the first fire blanket (10) and/or the second fire blanket (20) and/or optionally the third fire blanket (30), as described herein. The term "partially covers" means that the flame retardant element (60) is disposed only to a limited area of the plane surface formed by the top side.

In other embodiment, the flame retardant element (60) completely covers the top side of at least one of the first fire blanket (10) and/or the second fire blanket (20) and/or optionally the third fire blanket (30).

It is also possible in one embodiment that there can be disposed more than one flame retardant element (60), as described herein, on the top side of at least one of the first fire blanket (10) and/or the second fire blanket (20) and/or optionally the third fire blanket (30). In this case, more than one flame retardant element (60) either partially covers or completely covers the top side of the top side of at least one of the first fire blanket (10) and/or the second fire blanket (20) and/or optionally the third fire blanket (30).

In another embodiment, the flame retardant element (60) forms a void between at least one of the first fire blanket (10) and/or the second fire blanket (20) and/or optionally the third fire blanket (30). Alternatively, the said void can be filled in with the flame retardant materials, as described herein.

Figure 5:
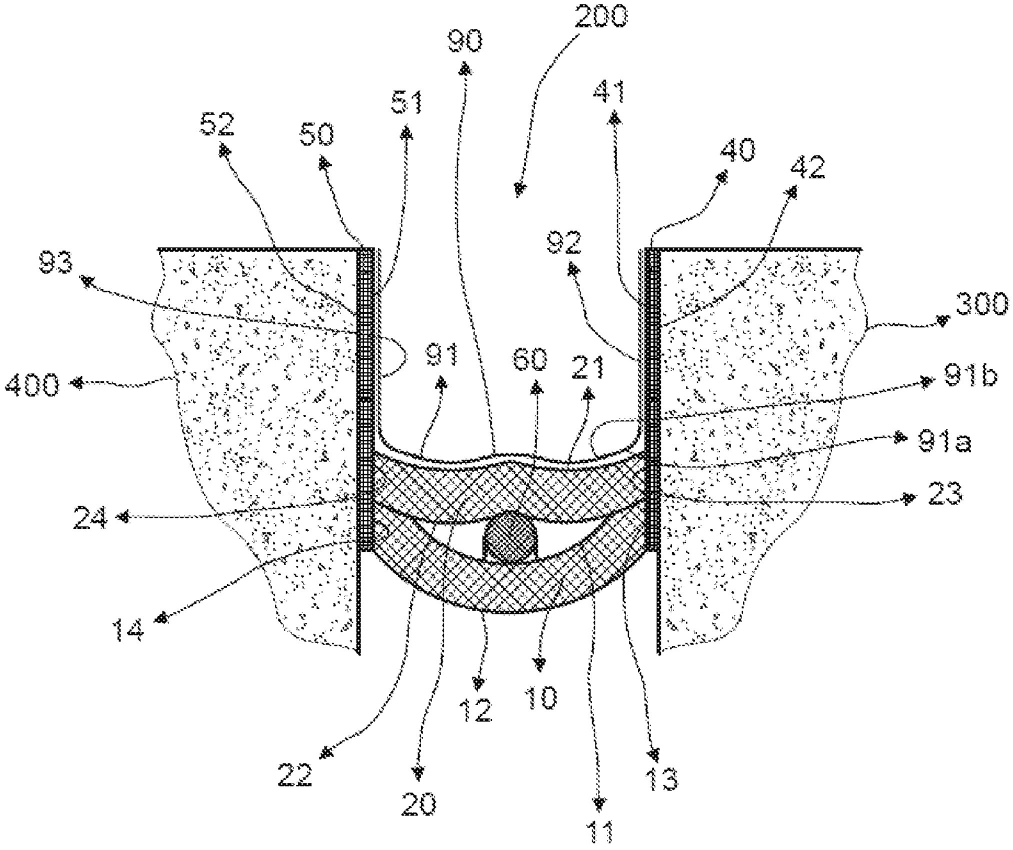
FIG. 5 illustrates the fire barrier comprising fire blankets, flame retardant element and waterproof gutter.

In one embodiment, as shown in FIGS. 1, 2 and 5, the flame retardant element (60) is disposed on the top side (11) of the first fire blanket (10). The flame retardant element (60) is disposed in a manner that a portion of the bottom side (22) of the second fire blanket rests on the flame retardant element (60), thereby creating the void between the first fire blanket (10) and the second fire blanket (20).

In another embodiment, the flame retardant element (60) is disposed on the top side (11) of the first fire blanket (10) and the top side (21) of the second fire blanket (20). As is shown in FIGS. 3 and 4, there are two flame retardant elements (60) disposed on the top sides of the first fire blanket (10) and the second fire blanket (20). In this case, a portion of the flame retardant element (60) is disposed on the top side (11) of the first fire blanket (10) with the portion of the bottom side (22) of the second fire blanket (20) resting on the flame retardant element (60), thereby creating the void between the first fire blanket (10) and the second fire blanket (20). Another flame retardant element (60) is disposed on the top side (21) of the second fire blanket (20) with a portion of the bottom side (32) of the third fire blanket (30) resting on the flame retardant element (60), thereby creating the void between the second fire blanket (20) and the third fire blanket (30).

In another embodiment, the flame retardant element (60) is disposed on the top side (21) of the second fire blanket (20) and the top side (31) of the third fire blanket (30). In this case, there are two flame retardant elements (60) disposed on the tops sides of the second fire blanket (20) and the third fire blanket (30). The flame retardant element (60) is disposed on the top side (21) of the second fire blanket (20) with the portion of the bottom side (32) of the third fire blanket (30) resting on the flame retardant element (60), thereby creating the void between the second fire blanket (20) and the third fire blanket (30). Another flame retardant element (60) is disposed on the top side (31) of the third fire blanket (30).

Figure 6:
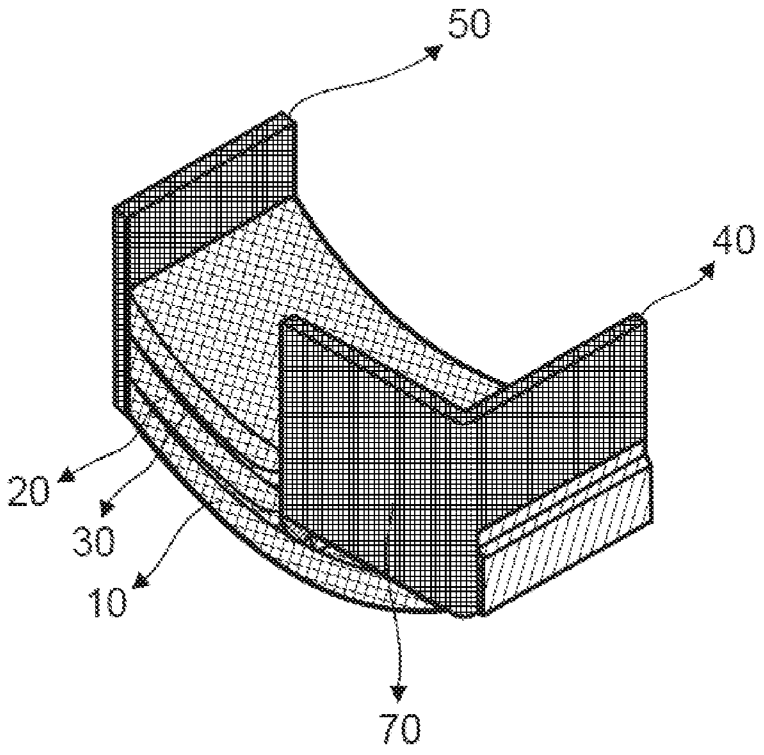
FIG. 6 illustrates the fire barrier comprising first foldable splice.

In another embodiment, as shown in FIG. 6, a portion of the first surface (41) of the first intumescent sheet (40) extends longitudinally to form a first foldable splice (70), said first foldable splice (70) being an integral part of the first intumescent sheet (40) and covers a portion of area enclosed by the top sides (11, 21, 31) and the first lateral sides (13, 23, 33) of the first fire blanket (10), the second fire blanket (20) and the third fire blanket (30). The first foldable splice (70) is capable of bending inward towards the fire blankets and therefore, covers the portion of area enclosed by the top sides (11, 21, 31) and the first lateral sides (13, 23, 33) of the first fire blanket (10), the second fire blanket (20) and the third fire blanket (30). Said otherwise, the first foldable splice (70) subtends an angle $\theta$ ranging in between 0° to 90° with the area enclosed by the top sides (11, 21, 31) and the first lateral side (13, 23, 33) of the first fire blanket (10), the second fire blanket (20) and the third fire blanket (30). At $\theta=0°$, the first foldable splice (70) covers the portion of the area enclosed by the top sides (11, 21, 31) and the first lateral sides (13, 23, 33) of the first fire blanket (10), the second fire blanket (20) and the third fire blanket (30). In this case, there is some portion of the said area that is not covered with the first foldable splice. However, when θ=90°, the first foldable splice (70) does not covers any of the portion of the said area.

In another embodiment, the first foldable splice (70) covers the entire area enclosed by the top sides (11, 21, 31) and the first lateral side (13, 23, 33) of the first fire blanket (10), the second fire blanket (20) and the third fire blanket (30). In this case, there is no portion of the said area which is open or not covered by the first foldable splice (70).

One of the advantages of the first foldable splice (70) is that during installment of more than one fire barriers (200), particularly in a series arrangement, between the first structure (300) and the second structure (300), the first foldable splice (70) of the fire barrier (200) covers a portion of area enclosed by the top sides (11, 21, 31) and the first lateral sides (13, 23, 33) of the first fire blanket (10), the second fire blanket (20) and the third fire blanket (30) of an adjacent fire barrier (70) and so on and so forth. In this manner, the uncovered portion of every adjacent fire barrier (200) is covered by the first foldable splice (70) of the fire barrier (200) immediately before. Thus, the first foldable splice (70) provides the fire barrier (200) with additional flame retardancy.

Figure 7:
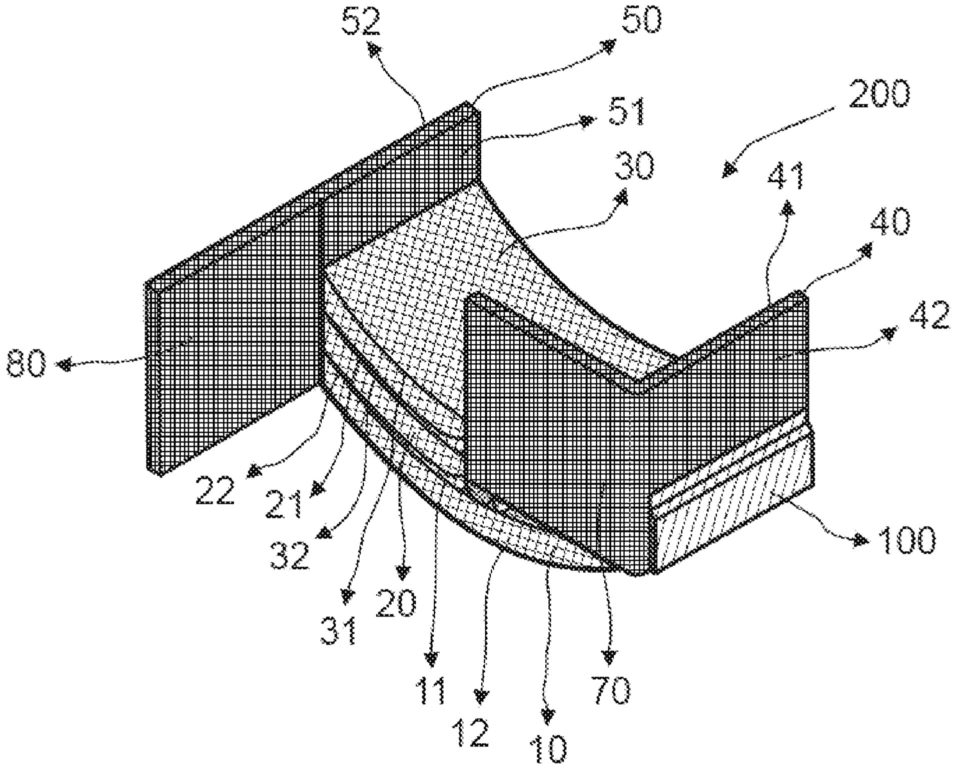
FIG. 7 illustrates the fire barrier comprising first foldable splice and second foldable splice.

In another embodiment, as shown in FIG. 7, a portion of the first surface (51) of the second intumescent sheet (50) extends longitudinally to form a second foldable splice (80), said second foldable splice (80) being an integral part of the second intumescent sheet (50) and covers a portion of the area enclosed by the top sides (11, 21, 31) and the first lateral sides (13, 23, 33) of the first fire blanket (10), the second fire blanket (20) and the third fire blanket (30). The term "integral part", as is used herein, means that the first foldable splice (70) and the second foldable splice (80) form part of one whole singularly formed first intumescent sheet (40) and the second intumescent sheet (50), respectively. Similar to the first foldable splice (70), the second foldable splice (80) is capable of bending inward towards the fire blankets and also subtends an angle β ranging in between 0° to 90° with the said area.

In another embodiment, the first foldable splice (70) overlaps with the second foldable splice (80).

In another embodiment, the fire barrier (200), as described herein, further comprises a waterproof gutter (90) as shown in FIG. 5. The waterproof gutter (90) comprises a bottom layer (91) and two lateral sides (92, 93). The bottom layer (91) comprises an outer surface (91*a*) and an inner surface (91*b*). The outer surface (91*a*) of the bottom layer (91) is affixed to the top side (11) of the first fire blanket (10) or the top side (21) of the second fire blanket (20) or optionally the top side (31) of the third fire blanket (30). One of the advantages of the waterproof gutter (90) is that it prevents any water seepage into the fire barrier (200), which would render the fire barrier (200) ineffective during fire.

Waterproof gutter (90), as the name suggests, comprises of materials which are resistant or impervious to water. Suitable materials are well known to the person skilled in the art. However, while selecting the waterproof materials, care should be taken that the said material does not affect the performance of the fire barrier (200). Said otherwise, the waterproof materials should not add substantially to the weight of the fire barrier (200), when affixed thereto. Accordingly, suitable waterproof materials that can be used for the purpose of the presently claimed invention include, such as but not limited to, natural and synthetic rubber, such as ethylene propylene diene monomer (EPDM), synthetic polymers, plastics and metals.

Although, the waterproof gutter (90) can have any shape and size, a U-shaped or concave shape is preferred. Also, the waterproof gutter (90) may form a void between the outer surface (91*a*) of the waterproof gutter (90) and the top side (11) of the first fire blanket (10) or the top side (21) of the second fire blanket (20) or optionally the top side (31) of the third fire blanket (30). In such cases, the void can be filled with the flame retardant materials, as described herein.

In an embodiment, the first lateral sides (13, 23, 33) of the first fire blanket (10), the second fire blanket (20) and optionally the third fire blanket (30), independent of each other, are affixed to the portion of the first surface (41) of the first intumescent sheet (40) with a first adhesive.

In another embodiment, the second lateral sides (14, 24, 34) of the first fire blanket (10), the second fire blanket (20) and optionally the third fire blanket (30), independent of each other, are affixed to the portion of the second surface (51) of the second intumescent sheet (50) with a second adhesive.

In another embodiment, the first intumescent sheet (40) and the second intumescent sheet (50) are affixed to the first structure (300) and the second structure (400), independent of each other, with a third adhesive.

In another embodiment, the fire barrier (200) further comprises a metal shroud (100) covering a portion of the fire barrier (200), said metal shroud (100) affixed to the second surfaces (42, 52) of the first intumescent sheet (40) and the second intumescent sheet (50), independent of each other, with a fourth adhesive. In one embodiment, the metal shroud (100) wraps the portion of the fire barrier as shown in FIGS. 3 and 4. The metal shroud (100) comprises of two lateral surfaces, of which one lateral surface is affixed to the second surface (42) of the first intumescent sheet (40), while the remaining lateral surface of the metal shroud (100) is affixed to the second surface (52) of the second intumescent sheet (50). The metal shroud (100) is affixed in a manner that a surface of the metal shroud (100) is in contact with the bottom side (12) of the first fire blanket (10), as shown in FIG. 4.

The presence of metal shroud (100) adds to the structural integrity of the fire barrier (200). Although, any suitable metal can be chosen for constructing the metal shroud (100), the chosen metal should not add to the weight of the fire barrier (200) which would lead to sagging of the fire barrier (200), thereby affecting the performance of the fire barrier (200). Accordingly, in one embodiment, the metal shroud (100) is made from a single metal foil sheet. Suitable metal foil sheet comprises a stainless-steel mesh. In other embodiment, other metal foil sheets can also be employed in accordance with the presently claimed invention.

In other embodiment, the metal shroud (100) is affixed to the first intumescent sheet (40) and the second intumescent sheet (50), as described herein, by means of a fourth adhesive.

In one embodiment, the first adhesive, the second adhesive, the third adhesive and the fourth adhesive are all same and comprise a pressure sensitive adhesive, as described herein. In other embodiment, the first adhesive, the second adhesive, the third adhesive and the fourth adhesive are all different, as described herein.

Suitable adhesives employable as first, second, third and fourth adhesive are well known to the person skilled in the art. In one embodiment, the adhesives are pressure sensitive adhesives (PSAs). PSAs adhere to the surfaces to which they are applied, for instance, fire blankets, intumescent sheets, structures and metal shrouds. Typically, PSA is a material with viscoelastic properties which can adhere to a substrate upon application of pressure, and which remains adhesive afterward.

Suitable PSA comprises of acrylic polymers, silicones, siloxane block copolymers, rubber polymers, multifunctional crosslinking monomers (such as allyl methacrylate, diallyl maleate, N,N'-methylene-bis-acrylamide, etc.) and a mixture thereof. In one embodiment, the PSA comprises at least one member selected from an alkyl acrylate, a nitrogen-containing compound and a mixture thereof.

Suitable acrylates for use with the adhesive, especially when it is a PSA, are alkyl acrylates comprising in between 1 to 20 carbon atoms per alkyl group. Other preferred acrylics comprise vinyl ester monomers, e.g. vinyl acetate.

Suitable nitrogen-containing compounds include, such as but not limited to, N-vinyl pyrollidone, dimethyl acetamide, N-tertiary butyl acrylamide, N-vinyl acetamide and N-vinyl formamide.

In another embodiment, the first fire blanket (10) comprising the ceramic fiber blanket surrounded with the metal foil, the second fire blanket (20) comprising the ceramic fiber blanket surrounded with the metal foil and optionally the third fire blanket (30) comprising the ceramic fiber blanket surrounded with the metal foil in the fire barrier (200) are all affixed to each other and the components thereof by means of PSA. By the term "components thereof", it means that the ceramic fiber blanket and the metal foil are affixed using PSA to form the first fire blanket (10). Similarly for the second fire blanket (20) and the third fire blanket (30).

In the present context, intumescent material for the intumescent sheets (40, 50) and the flame retardant material include, but are not limited to, unexpanded vermiculite, hydrobiotite, or water-swelling tetrasilicic fluorine mica, or mixtures thereof. These mixtures are held together by inorganic or organic binders which help form the sheet. The intumescent sheet preferably has a graphite or metal backing, such as aluminum, stainless steel, graphite or copper, or any combination thereof. Multiple layers may be used, and ceramic fiber may be added to increase fire suppression ability. The material can be produced by standard paper-making techniques as described, for example in U.S. Pat. Nos. 3,458,329 A, 3,916,057 A and 4,305,992 A, all incorporated herein by reference.

Another aspect of the presently claimed invention relates to the method for installing an expansion joint fire barrier, comprising the steps of:

(A) providing the first structure (300) and the second structure (400) spatially separated to form an expansion joint therebetween, and (B) affixing at least one fire barrier (200) as described herein into the expansion joint.

In another aspect, the presently claimed invention is directed to a method for installing an expansion joint fire barrier, comprising the steps of:

(A) providing a first structure (300) and a second structure (400) spatially separated to form an expansion joint therebetween, and (B) affixing at least one fire barrier (200) into the expansion joint, the fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50).

In another aspect, the presently claimed invention is directed to a method for installing an expansion joint fire barrier, comprising the steps of:

(A) providing a first structure (300) and a second structure (400) spatially separated to form an expansion joint therebetween, and (B) affixing at least one fire barrier (200) into the expansion joint, the fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).

The fire barrier (200) of the presently claimed invention is installed between the first structure (300) and the second structure (400). The spatial arrangement or the separation between the first structure (300) and the second structure (400) is referred herein as the expansion joint.

In an embodiment, the step (B), as described herein, comprises:

(B1) affixing the second surface (42) of the first intumescent sheet (40) to the first structure (300), and (B2) affixing the second surface (52) of the second intumescent sheet (50) to the second structure (400), wherein affixing in step (B1) and (B2) is carried out by means of the pressure sensitive adhesive.

The pressure sensitive adhesive for affixing the second surface (42) of the first intumescent sheet (40) and the second surface (52) of the second intumescent sheet (50) is the same as described herein.

In one embodiment, a plurality of fire barriers (200) are placed in the expansion joint, as described herein. Although, the fire barriers (200) can be placed in any manner in the expansion joint, a series arrangement of the fire barriers (200) is of particular preference. In the series arrangement, the first foldable splice (70) of one of the fire barriers (200) covers the portion of the area enclosed by the top sides (11, 21, 31) and the first lateral sides (13, 23, 33) of the first fire blanket (10), the second fire blanket (20) and the third fire blanket (30) of an adjacent fire barrier (70) and so on and so forth. In this manner, the uncovered portion of every adjacent fire barrier (200) is covered by the first foldable splice (70) of the fire barrier (200) immediately before. Also, the plurality of fire barriers (200) is affixed to the first structure (300) and the second structure (400) by PSAs, as described herein. This is carried out by affixing the second surfaces (42) of the first intumescent sheets (40) of the plurality of fire barriers (200) to the first structure (300) and the second surfaces (52) of the second intumescent sheets (50) of the plurality of fire barriers (200) to the second structure (400), as described herein.

In other embodiment, several of the plurality of fire barriers (200) may comprise of the second foldable splice (80), as described herein. In another embodiment, all the fire barriers (200) comprise of the second foldable splice (80). In any of these situations, the plurality of fire barriers (200) can be placed in any manner. In a series arrangement, the plurality of fire barriers (200) have at least a portion of the area enclosed by top sides (11, 21, 31) and the first lateral sides (13, 23, 33) of the first fire blanket (10), the second fire blanket (20) and the third fire blanket (30) covered by the said first foldable splice (70) and the second foldable splice (80), while a remaining portion of the said area remains uncovered. The said remaining portion may or may not be covered by the first foldable splice (70) and the second foldable splice (80) of the adjacent fire barrier (200). Alternatively, any suitable flame retardant material, as described herein, may be used to cover the said remaining portion.

In still another embodiment, the first foldable splice (70) and the second foldable splice (80) cover the entire area enclosed by the top sides (11, 21, 31) and the first lateral sides (13, 23, 33) of the first fire blanket (10), the second fire blanket (20) and the third fire blanket (30).

In another embodiment, a single first intumescent sheet (40) and a single second intumescent sheet (50) are affixed to the first structure (300) and the second structure (400) by means of PSAs applied on the second surfaces (42) of the said single first intumescent sheet (40) and the second surface (52) of the said single second intumescent sheet (50). In such a case, the first and second intumescent sheets (40, 50) are of suitable dimensions covering the entire expansion joint and capable of affixing the plurality of fire barriers (200) thereto, as described herein. Also, similar to above, the fire barriers (200) can comprise the first foldable splice (70) and/or the second foldable splice in the manner as described herein. The said first foldable splice (70) and/or the second foldable splice (80) can be arranged in the manner so as to cover the entire area or a portion of the area enclosed by the top sides (11, 21, 31) and the first lateral sides (13, 23, 33) of the first fire blanket (10), the second fire blanket (20) and the third fire blanket (30) of the fire barriers (200), as described herein.

Another aspect of the presently claimed invention relates to the expansion joint system (110) comprising:

the first structure (300) and the second structure (400) spatially separated to form the expansion joint therebetween, and the fire barrier (200) as described herein, wherein the second surface (42) of the first intumescent sheet (40) is affixed to the first structure (300) and the second surface (52) of the second intumescent sheet (50) is affixed to the second structure (400).

In still another aspect, the presently claimed invention is directed to an expansion joint system (110) comprising:

a first structure (300) and a second structure (400) spatially separated to form an expansion joint therebetween, and a fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50), wherein the second surface (42) of the first intumescent sheet (40) is affixed to the first structure (300) and the second surface (52) of the second intumescent sheet (50) is affixed to the second structure (400).

In still another aspect, the presently claimed invention is directed to an expansion joint system (110) comprising:

a first structure (300) and a second structure (400) spatially separated to form an expansion joint therebetween, and a fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) affixed to a first structure (300), and a second intumescent sheet (50) having a first surface (51) and a second surface (52), said second intumescent sheet (50) affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50), wherein the second surface (42) of the first intumescent sheet (40) is affixed to the first structure (300) and the second surface (52) of the second intumescent sheet (50) is affixed to the second structure (400).

Yet another aspect of the presently claimed invention relates to the fire barrier assembly comprising:

at least one fire barrier (200) as described herein, and at least one pressure sensitive adhesive that affixes the at least one fire barrier (200) to the second surface (42) of the first intumescent sheet (40) and the second surface (52) of the second intumescent sheet (50).

In yet another aspect, the presently claimed invention is directed to a fire barrier assembly comprising:

at least one fire barrier (200) comprising a fire blanket (10) having a top side (11), a bottom side (12), a first lateral side (13) and a second lateral side (14), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50), and at least one pressure sensitive adhesive that affixes the at least one fire barrier (200) to the second surface (42) of the first intumescent sheet (40) and the second surface (52) of the second intumescent sheet (50).

In yet another aspect, the presently claimed invention is directed to a fire barrier assembly comprising:

at least one fire barrier (200) comprising a first fire blanket (10) having a top side (11), a bottom side (12), a first lateral side (13) and a second lateral side (14), a second fire blanket (20) having a top side (21), a bottom side (22), a first lateral side (23) and a second lateral side (24), a first intumescent sheet (40) having a first surface (41) and a second surface (42), said first intumescent sheet (40) configured to be affixed to a first structure (300), and a second intumescent sheet (50) having a first surface (51) and a second surface (52), said second intumescent sheet (50) configured to be affixed to a second structure (400), wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50), and at least one pressure sensitive adhesive that affixes the at least one fire barrier (200) to the second surface (42) of the first intumescent sheet (40) and the second surface (52) of the second intumescent sheet (50).

In one embodiment, the fire barrier assembly comprises the plurality of fire barriers (200), as described herein. Although, the fire barriers (200) can be placed in any manner within the fire barrier assembly, a series arrangement of the fire barriers (200) is of particular preference. In the series arrangement, the first foldable splice (70) of one of the fire barriers (200) covers the portion of the area enclosed by the top sides (11, 21, 31) and the first lateral sides (13, 23, 33) of the first fire blanket (10), the second fire blanket (20) and the third fire blanket (30) of an adjacent fire barrier (70) and so on and so forth. In this manner, the uncovered portion of every adjacent fire barrier (200) is covered by the first foldable splice (70) of the fire barrier (200) immediately before. Also, the plurality of fire barriers (200) is affixed to the first structure (300) and the second structure (400) by PSAs, as described herein. This is carried out by affixing the second surfaces (42) of the first intumescent sheets (40) of the plurality of fire barriers (200) to the first structure (300) and the second surfaces (52) of the second intumescent sheets (50) of the plurality of fire barriers (200) to the second structure (400), as described herein.

In other embodiment, several of the plurality of fire barriers (200) comprise of the second foldable splice (80), as described herein. In another embodiment, all the fire barriers (200) comprise of the second foldable splice (80). In any of these situations, the plurality of fire barriers (200) can be placed in any manner. In a series arrangement, the plurality of fire barriers (200) have at least the portion of the area enclosed by top sides (11, 21, 31) and the first lateral sides (13, 23, 33) of the first fire blanket (10), the second fire blanket (20) and the third fire blanket (30) covered by the said first foldable splice (70) and the second foldable splice (80), while the remaining portion of the said area remains uncovered. The said remaining portion may or may not be covered by the first foldable splice (70) and the second foldable splice (80) of the adjacent fire barrier (200). Alternatively, any suitable flame retardant material, as described herein, may be used to cover the said remaining portion.

In still another embodiment, the first foldable splice (70) and the second foldable splice (80) cover the entire area enclosed by the top sides (11, 21, 31) and the first lateral sides (13, 23, 33) of the first fire blanket (10), the second fire blanket (20) and the third fire blanket (30).

In another embodiment, a single first intumescent sheet (40) and a single second intumescent sheet (50) are affixed to the first structure (300) and the second structure (400) by means of PSAs applied on the second surfaces (42) of the said single first intumescent sheet (40) and the second surface (52) of the said single second intumescent sheet (50). In such a case, the first and second intumescent sheets (40, 50) are of suitable dimensions covering the entire expansion joint and capable of affixing the plurality of fire barriers (200) thereto, as described herein. Also, similar to above, the fire barriers (200) can comprise the first foldable splice (70) and/or the second foldable splice in the manner as described herein. The said first foldable splice (70) and/or the second foldable splice (80) can be arranged in the manner so as to cover the entire area or a portion of the area enclosed by the top sides (11, 21, 31) and the first lateral sides (13, 23, 33) of the first fire blanket (10), the second fire blanket (20) and the third fire blanket (30) of the fire barriers (200), as described herein.

In another embodiment, the fire barrier assembly further comprises an instruction sheet or instructions for installation in the expansion joint, as described herein.

The fire barrier (200), as described herein, has several advantages over the existing fire barriers, for e.g.:

capability to meet the requirement for 3-hour fire-rating according to UL 2079, easy to install, acceptable fire protection, and cost effective.

| List of reference numeral | |
|---|---|
| 200 | Fire barrier |
| 300 | First structure |
| 400 | Second structure |
| 10 | First fire blanket |
| 11 | Top side of first fire blanket |
| 12 | Bottom side of first fire blanket |
| 13 | First lateral side of first fire blanket |
| 14 | Second lateral side of first fire blanket |
| 20 | Second fire blanket |
| 21 | Top side of second fire blanket |
| 22 | Bottom side of second fire blanket |
| 23 | First lateral side of second fire blanket |
| 24 | Second lateral side of second fire blanket |
| 30 | Third fire blanket |
| 31 | Top side of third fire blanket |
| 32 | Bottom side of third fire blanket |
| 33 | First lateral side of third fire blanket |
| 34 | Second lateral side of third fire blanket |
| 40 | First intumescent sheet |

-continued

| List of reference numeral | |
|---|---|
| 41 | First surface of the first intumescent sheet |
| 42 | Second surface of the first intumescent sheet |
| 50 | Second intumescent sheet |
| 51 | First surface of the second intumescent sheet |
| 52 | Second surface of the second intumescent sheet |
| 60 | Flame retardant element |
| 70 | First foldable splice |
| 80 | Second foldable splice |
| 90 | Waterproof gutter |
| 91 | Bottom layer of waterproof gutter |
| 91a | Outer surface of bottom layer |
| 91b | Inner surface of bottom layer |
| 92, 93 | Lateral sides of waterproof gutter |
| 100 | Metal shroud |
| 110 | Expansion joint system |

The presently claimed invention is illustrated in more detail by the following embodiments and combinations of the embodiments which result from the corresponding dependency references and links:

1. A fire barrier (200) comprising:
   a first fire blanket (10) having a top side (11), a bottom side (12), a first lateral side (13) and a second lateral side (14),
   a first intumescent sheet (40) having a first surface (41) and a second surface (42), said first intumescent sheet (40) affixed to a first structure (300), and
   a second intumescent sheet (50) having a first surface (51) and a second surface (52), said second intumescent sheet (50) affixed to a second structure (400),
   wherein the first lateral side (13) of the fire blanket (10) is affixed to a portion of the first surface (41) of the first intumescent sheet (40) and the second lateral side (14) of the fire blanket (10) is affixed to a portion of the first surface (51) of the second intumescent sheet (50).
2. A fire barrier (200) comprising:
   a first fire blanket (10) having a top side (11), a bottom side (12), a first lateral side (13) and a second lateral side (14),
   a second fire blanket (20) having a top side (21), a bottom side (22), a first lateral side (23) and a second lateral side (24),
   a first intumescent sheet (40) having a first surface (41) and a second surface (42), said first intumescent sheet (40) affixed to a first structure (300), and
   a second intumescent sheet (50) having a first surface (51) and a second surface (52), said second intumescent sheet (50) affixed to a second structure (400),
   wherein the first lateral side (13) of the first fire blanket (10) and the first lateral side (23) of the second fire blanket (20) are affixed to a portion of the first surface (41) of the first intumescent sheet (40) and the second lateral side (14) of the first fire blanket (10) and the second lateral side (24) of the second fire blanket (20) are affixed to a portion of the first surface (51) of the second intumescent sheet (50).
3. The fire barrier (200) according to embodiment 1 or 2, which is capable of meeting the requirement for a 3-hour fire-rating according to UL 2079.
4. The fire barrier (200) according to any one of embodiments 1 to 3, wherein at least one of the first (10) and second (20) fire blankets is surrounded by a metal foil.
5. The fire barrier (200) according to any one of embodiments 1 to 4, further comprising a third fire blanket (30) having a top side (31), a bottom side (32), a first lateral side (33) and a second lateral side (34).
6. The fire barrier (200) according to embodiment 5, wherein the third fire blanket (30) comprises a ceramic fiber blanket surrounded with a metal foil.
7. The fire barrier (200) according to any one of embodiments 1 to 6, wherein at least one of the first (10), second (20) and third (30) fire blankets comprises alkaline earth silicate wool fibers, polycrystalline wool fibers, alumina magnesia silicate fibers, calcium silicate fibers, kaowool fibers, rockwool fibers, mineral wool fibers, slag wool fibers, stone wool fibers, silica fibers, or combinations thereof.
8. The fire barrier (200) according to embodiment 7, wherein the alkaline earth silicate wool fibers comprise magnesium silicate fibers, calcium magnesium silicate fibers and combinations thereof.
9. The fire barrier (200) according to embodiment 7, wherein the polycrystalline wool fibers comprise fibers comprising a mullite composition having greater than 70 weight percent silica and alumina.
10. The fire barrier (200) according to embodiment 7, wherein the polycrystalline wool fibers comprise high alumina polycrystalline wool fibers having greater than 90 weight percent alumina.
11. The fire barrier (200) according to embodiment 7, wherein the silica fibers greater than 90 weight percent silica.
12. The fire barrier (200) according to any one of embodiments 1 to 11, further comprising at least one flame retardant element (60) disposed on the top side of at least one of the first fire blanket (10) and/or the second fire blanket (20) and/or optionally the third fire blanket (30).
13. The fire barrier (200) according to embodiment 12, wherein the flame retardant element (60) comprises of ceramic fiber, mineral wool, rock wool, calcium silicate, sodium silicate, potassium silicate, magnesium oxide, intumescent material and silicone.
14. The fire barrier (200) according to any one of embodiments 11 to 13, wherein the flame retardant element (60) comprises of ceramic fiber.
15. The fire barrier (200) according to any one of embodiments 11 to 14, wherein the at least one flame retardant element (60) is disposed on the top side (11) of the first fire blanket (10).
16. The fire barrier (200) according to any one of embodiments 11 to 14, wherein the at least one flame retardant element (60) is disposed on the top side (11) of the first fire blanket (10) and the top side (21) of the second fire blanket (20).
17. The fire barrier (200) according to any one of embodiments 11 to 14, wherein the at least one flame retardant element (60) is disposed on the top side (21) of the second fire blanket (20) and the top side (31) of the third fire blanket (30).
18. The fire barrier (200) according to any one of embodiments 1 to 17, wherein a portion of the first surface (41) of the first intumescent sheet (40) extends longitudinally to form a first foldable splice (70), said first foldable splice (70) is an integral part of the first intumescent sheet (40) and covers a portion of area enclosed by the top sides (11, 21, 31) and the first lateral sides (13, 23, 33) of the first fire blanket (10), the second fire blanket (20) and the third fire blanket (30).
19. The fire barrier (200) according to any one of embodiments 1 to 18, wherein a portion of the first surface (51) of the second intumescent sheet (50) extends longitudinally to form a second foldable splice (80), said second foldable splice (80) is an integral part of the second intumescent sheet (50) and covers a portion of area enclosed by the top sides (11, 21, 31) and the first lateral sides (13, 23, 33) of the first fire blanket (10), the second fire blanket (20) and the third fire blanket (30).

20. The fire barrier (200) according to any one of embodiments 1 to 19, further comprising a waterproof gutter (90), wherein the waterproof gutter (90) comprises a bottom layer (91) and two lateral sides (92, 93), wherein the bottom layer (91) comprises an outer surface (91*a*) and an inner surface (91*b*), and wherein the outer surface (91*a*) of the bottom layer (91) of the waterproof gutter (90) is affixed to the top side (11) of the first fire blanket (10) or the top side (21) of the second fire blanket (20) or optionally the top side (31) of the third fire blanket (30).

21. The fire barrier (200) according to one or more of embodiments 1 to 20, wherein the first lateral sides (13, 23, 33) of the first fire blanket (10), the second fire blanket (20) and optionally the third fire blanket (30), independent of each other, are affixed to the portion of the first surface (41) of the first intumescent sheet (40) with a first adhesive.

22. The fire barrier (200) according to one or more of embodiments 1 to 21, wherein the second lateral sides (14, 24, 34) of the first fire blanket (10), the second fire blanket (20) and optionally the third fire blanket (30), independent of each other, are affixed to the portion of the second surface (51) of the second intumescent sheet (50) with a second adhesive.

23. The fire barrier (200) according to one or more of embodiments 1 to 22, wherein the first intumescent sheet (40) and the second intumescent sheet (50) are affixed to the first structure (300) and the second structure (400), independent of each other, with a third adhesive.

24. The fire barrier (200) according to any one of embodiments 1 to 23, further comprising a metal shroud (100) covering a portion of the fire barrier (200), said metal shroud (100) affixed to the second surfaces (42, 52) of the first intumescent sheet (40) and the second intumescent sheet (50), independent of each other, with a fourth adhesive.

25. The fire barrier (200) according to embodiment 24, wherein the metal shroud (100) comprises a stainless-steel mesh.

26. The fire barrier (200) according to one or more of embodiments 21 to 25, wherein the first adhesive, the second adhesive, the third adhesive and the fourth adhesive are all same and comprise a pressure sensitive adhesive.

27. The fire barrier (200) according to embodiment 26, wherein the pressure sensitive adhesive comprises an acrylate, a silicone, a rubber polymer, a multifunctional cross-linking member and a mixture thereof.

28. The fire barrier (200) according to embodiment 27, wherein the pressure sensitive adhesive comprises at least one member selected from an alkyl acrylate, a nitrogen-containing compound and a mixture thereof 29. A method for installing an expansion joint fire barrier, comprising the steps of:

(A) providing a first structure (300) and a second structure (400) spatially separated to form an expansion joint therebetween, and (B) affixing at least one fire barrier (200) according to any one of embodiments 1 to 28 into the expansion joint.

30. An expansion joint system (110) comprising:

a first structure (300) and a second structure (400) spatially separated to form an expansion joint therebetween, and a fire barrier (200) according to any one of embodiments 1 to 28, wherein the second surface (42) of the first intumescent sheet (40) is affixed to the first structure (300), and the second surface (52) of the second intumescent sheet (50) is affixed to the second structure (400).

31. A fire barrier assembly comprising:

at least one fire barrier (200) according to any one of embodiments 1 to 28, and at least one pressure sensitive adhesive that affixes the at least one fire barrier (200) to the second surface (42) of the first intumescent sheet (40) and the second surface (52) of the second intumescent sheet (50).

EXAMPLES

The presently claimed invention is illustrated by the non-restrictive examples which are as follows:

Example 1

A fire barrier (200) was constructed having two fire blankets (10, 20), as shown in FIG. 2, however, without the flame retardant element (60). The fire barrier (200) was subjected to the UL 2079 test in a 8 feet×4 feet vertical furnace opening for 3-hour with a Gold Bond® Sheetrock, as the first structure (300) and the second structure (400). Four sheets of the Gold Bond® Sheetrock, each measuring ⅝ inch, were used to construct the first structure (300) and the second structure (400). The expansion joint formed thereby had a minimal opening of 1 inch, a nominal opening of 2 inch and a maximum opening of 3 inch. The fire barrier (200) was positioned backward and subjected to fire in accordance with UL 2079. The fire barrier (200) was measured by a thermocouple, which showed a maximum single temperature rise of 50.5° C. in 3-hours. The fire barrier (200) passed the base test in accordance with the requirements of UL 2079. The average temperature rise was 23.8° C., which is much lower than the condition prevalent during fire. Further, the intumescent sheets were found to completely fill the 3 inch opening in the expansion joint, thereby providing excellent block for hose stream.

The invention claimed is:

1. A fire barrier comprising:

a first fire blanket having a top side, a bottom side, a first lateral side and a second lateral side, a second fire blanket having a top side, a bottom side, a first lateral side and a second lateral side, said second fire blanket, a first intumescent sheet having a first surface and a second surface, said first intumescent sheet affixed to a first structure, a second intumescent sheet having a first surface and a second surface, said second intumescent sheet affixed to a second structure; and at least one flame retardant element disposed on the top side of the first fire blanket, the at least one flame retardant element partially covering the top side of the first fire blanket, such that a void is formed between the first fire blanket and the second fire blanket, wherein the first lateral side of the first fire blanket and the first lateral side of the second fire blanket are affixed to a portion of the first surface of the first intumescent sheet and the second lateral side of the first fire blanket and the second lateral side of the second fire blanket are affixed to a portion of the first surface of the second intumescent sheet.

2. The fire barrier according to claim 1, wherein at least one of the first and second fire blankets is surrounded by a metal foil.

3. The fire barrier according to claim 1, further comprising a third fire blanket having a top side, a bottom side, a first lateral side, and a second lateral side.

4. The fire barrier according to claim 3, wherein the third fire blanket comprises a ceramic fiber blanket surrounded with a metal foil.

5. The fire barrier according to claim 4, wherein the third fire blanket comprises a ceramic fiber blanket surrounded with a metal foil.

6. The fire barrier according to claim 1, further comprising a third fire blanket having a top side, a bottom side, a first lateral side and a second lateral side.

7. The fire barrier according to claim 1, wherein at least one of the first and second fire blankets comprises alkaline earth silicate wool fibers, polycrystalline wool fibers, alumina magnesia silicate fibers, calcium silicate fibers, kaowool fibers, rockwool fibers, mineral wool fibers, slag wool fibers, stone wool fibers, silica fibers, or combinations thereof.

8. The fire barrier according to claim 7, wherein the alkaline earth silicate wool fibers comprise magnesium silicate fibers, calcium magnesium silicate fibers and combinations thereof.

9. The fire barrier according to claim 7, wherein the polycrystalline wool fibers comprise fibers comprising a mullite composition having greater than 70 weight percent silica and alumina.

10. The fire barrier according to claim 7, wherein the polycrystalline wool fibers comprise high alumina polycrystalline wool fibers having greater than 90 weight percent alumina.

11. The fire barrier according to claim 7, wherein the silica fibers greater than 90 weight percent silica.

12. The fire barrier according to claim 1, wherein the flame retardant element comprises of ceramic fiber, mineral wool, rock wool, calcium silicate, sodium silicate, potassium silicate, magnesium oxide, intumescent material and silicone.

13. The fire barrier according to claim 12, wherein the flame retardant element comprises of ceramic fiber.

14. The fire barrier according to claim 1, wherein the at least one flame retardant element is disposed on the top side of the first fire blanket and also on the top side of the second fire blanket.

15. The fire barrier according to claim 1, wherein the at least one flame retardant element is also disposed on the top side of the second fire blanket and the top side of a third fire blanket.

16. The fire barrier according to claim 1, wherein a portion of the first surface of the first intumescent sheet extends longitudinally to form a first foldable splice, said first foldable splice is an integral part of the first intumescent sheet and covers a portion of area enclosed by the top sides and the first lateral sides of the first fire blanket, the second fire blanket and a third fire blanket.

17. The fire barrier according to claim 1, further comprising a waterproof gutter, wherein the waterproof gutter comprises a bottom layer and two lateral sides, wherein the bottom layer comprises an outer surface and an inner surface, and wherein the outer surface of the bottom layer of the waterproof gutter is affixed to the top side of the first fire blanket or the top side of the second fire blanket or the top side of a third fire blanket.

18. The fire barrier according to claim 1, further comprising a metal shroud covering a portion of the fire barrier, said metal shroud affixed to the second surfaces of the first intumescent sheet and the second intumescent sheet, independent of each other, with a fourth adhesive.

19. The fire barrier according to claim 18, wherein the metal shroud comprises a stainless-steel mesh.

20. A method for installing an expansion joint fire barrier, comprising the steps of:

a. providing a first structure and a second structure spatially separated to form an expansion joint therebetween, and b. affixing at least one fire barrier according to claim 1 into the expansion joint.

21. An expansion joint system comprising:

a first structure and a second structure spatially separated to form an expansion joint therebetween, and a fire barrier according to claim 1, wherein the second surface of the first intumescent sheet is affixed to the first structure, and the second surface of the second intumescent sheet is affixed to the second structure.

22. A fire barrier assembly comprising:

at least one fire barrier according to claim 1, and at least one pressure sensitive adhesive that affixes the at least one fire barrier to the second surface of the first intumescent sheet and the second surface of the second intumescent sheet.

* * * * *